US012285386B2

(12) United States Patent
Falk

(10) Patent No.: US 12,285,386 B2
(45) Date of Patent: *Apr. 29, 2025

(54) CPR CHEST COMPRESSION DEVICE WITH RELEASABLE BASE MEMBER

(71) Applicant: PHYSIO-CONTROL, INC., Redmond, WA (US)

(72) Inventor: Thomas Falk, Staffanstorp (SE)

(73) Assignee: PHYSIO-CONTROL, INC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,101

(22) Filed: Nov. 8, 2023

(65) Prior Publication Data

US 2024/0082105 A1 Mar. 14, 2024

Related U.S. Application Data

(63) Continuation of application No. 17/507,569, filed on Oct. 21, 2021, now Pat. No. 11,844,743, which is a continuation of application No. 16/168,432, filed on Oct. 23, 2018, now Pat. No. 11,154,454.

(60) Provisional application No. 62/576,047, filed on Oct. 23, 2017.

(51) Int. Cl.

| | |
|---|---|
| ***A61H 31/00*** | (2006.01) |
| ***A61H 1/00*** | (2006.01) |
| ***A61H 31/02*** | (2006.01) |

(52) U.S. Cl.

CPC ............. *A61H 31/008* (2013.01); *A61H 1/00* (2013.01); *A61H 1/006* (2013.01); *A61H 1/008* (2013.01); *A61H 31/00* (2013.01); *A61H 31/004* (2013.01); *A61H 31/007* (2013.01); *A61H 31/02* (2013.01);

(Continued)

(58) Field of Classification Search

CPC ............ A61H 31/00-02; A61H 31/005; A61H 31/006; A61H 2201/149; A61H 2201/1246; A61H 31/004; A61H 31/008; A61H 1/006-008; F16B 2/10; F16B 2/18;

(Continued)

(56) References Cited

U.S. PATENT DOCUMENTS

| | | | |
|---|---|---|---|
| 3,219,031 | A | 11/1965 | Rentsch, Jr. |
| 3,461,858 | A | 8/1969 | Michelson |
| 3,739,771 | A | 6/1973 | Gaquer et al. |

(Continued)

*Primary Examiner* — Justine R Yu
*Assistant Examiner* — Alexander Morales
(74) *Attorney, Agent, or Firm* — Miller Nash LLP

(57) ABSTRACT

A CPR device having a base member configured to be placed underneath a patient, a chest compression mechanism configured to deliver CPR chest compressions to the patient, a support leg configured to support the chest compression mechanism at a distance from the base member, a clamp mechanism coupled to the support leg, and a release mechanism coupled to the support leg and the clamp mechanism. The clamp mechanism is configured to attach the support leg to a lock component of the base member in a latch-closed configuration and to release the support leg from the lock component in a latch-open configuration. The clamp mechanism is further configured to transition from the latch-closed configuration to the latch-open configuration when the lock component of the base member impacts an external portion of the clamp mechanism without the release mechanism being pulled away from the base member.

10 Claims, 8 Drawing Sheets

(52) U.S. Cl.
CPC ..... *A61H 2201/5007* (2013.01); *Y10T 403/59* (2015.01); *Y10T 403/595* (2015.01)

(58) Field of Classification Search
CPC ............... Y10T 403/59; Y10T 403/591; Y10T 403/595; Y10T 403/593
See application file for complete search history.

(56) References Cited

U.S. PATENT DOCUMENTS

| | | | | |
|---|---|---|---|---|
| 4,890,605 | A | 1/1990 | Rosendale | |
| 5,287,846 | A | 2/1994 | Capjon et al. | |
| 5,339,853 | A | 8/1994 | Sokolis et al. | |
| 5,845,351 | A | 12/1998 | Berta et al. | |
| 5,884,969 | A | 3/1999 | Gebhard | |
| 5,934,282 | A | 8/1999 | Young, III et al. | |
| 6,174,295 | B1 | 1/2001 | Cantrell et al. | |
| 6,446,285 | B1 | 9/2002 | Chinn | |
| 6,547,289 | B1 | 4/2003 | Greenheck et al. | |
| 7,118,301 | B2 * | 10/2006 | Toguchi | B65D 21/0209 292/108 |
| 11,844,743 | B2 * | 12/2023 | Falk | A61H 1/00 |
| 2003/0181834 | A1 | 9/2003 | Sebelius et al. | |
| 2007/0072740 | A1 | 3/2007 | Kaufman | |
| 2008/0276429 | A1 * | 11/2008 | Bukovitz | B25G 3/14 403/321 |
| 2011/0099773 | A1 | 5/2011 | Golden et al. | |
| 2011/0243653 | A1 | 10/2011 | Buckingham et al. | |
| 2012/0042881 | A1 | 2/2012 | Paulussen et al. | |
| 2012/0276428 | A1 | 11/2012 | Pendry | |
| 2014/0121576 | A1 | 5/2014 | Nilsson et al. | |
| 2015/0119768 | A1 | 4/2015 | Meier et al. | |
| 2016/0242996 | A1 | 8/2016 | von Schenck et al. | |
| 2016/0338904 | A1 | 11/2016 | Lurie et al. | |
| 2017/0066383 | A1 * | 3/2017 | Benedict | F16B 2/185 |
| 2017/0156979 | A1 | 6/2017 | Walden et al. | |
| 2017/0216137 | A1 | 8/2017 | von Schenck et al. | |
| 2017/0348190 | A1 | 12/2017 | Ehrstedt et al. | |

* cited by examiner

CPR CHEST COMPRESSION DEVICE WITH RELEASABLE BASE MEMBER

CROSS-REFERENCES TO RELATED APPLICATIONS

This application is a continuation of U.S. non-provisional patent application Ser. No. 17/507,569, filed Oct. 21, 2021, which is continuation of U.S. non-provisional patent application Ser. No. 16/168,432, filed Oct. 23, 2018 (issued Oct. 26, 2021, as U.S. Pat. No. 11,154,454), which claims the benefit of U.S. provisional patent application No. 62/576,047 filed Oct. 23, 2017, the disclosures of all of which are incorporated by reference herein in their entirety.

FIELD OF THE INVENTION

This disclosure is directed to devices and methods for CPR machines that deliver CPR chest compressions to a patient.

BACKGROUND

Cardiopulmonary resuscitation (CPR) is a medical procedure performed on patients to maintain some level of circulatory and respiratory functions when patients otherwise have limited or no circulatory and respiratory functions. CPR is generally not a procedure that restarts circulatory and respiratory functions, but can be effective to preserve enough circulatory and respiratory functions for a patient to survive until the patient's own circulatory and respiratory functions are restored. CPR typically includes frequent torso compressions that usually are performed by pushing on or around the patient's sternum while the patient is lying on the patient's back. For example, torso compressions can be performed as at a rate of about 100 compressions per minute and at a depth of about 5 cm per compression for an adult patient. The frequency and depth of compressions can vary based on a number of factors, such as valid CPR guidelines.

Mechanical CPR has several advantages over manual CPR. A person performing CPR, such as a medical first-responder, must exert considerable physical effort to maintain proper compression timing and depth. Over time, fatigue can set in and compressions can become less consistent and less effective. The person performing CPR must also divert mental attention to performing manual CPR properly and may not be able to focus on other tasks that could help the patient. For example, a person performing CPR at a rate of 100 compressions per minute would likely not be able to simultaneously prepare a defibrillator for use to attempt to correct the patient's heart rhythm. Mechanical compression devices can be used with CPR to perform compressions that would otherwise be done manually. Mechanical compression devices can provide advantages such as providing constant, proper compressions for sustained lengths of time without fatiguing, freeing medical personnel to perform other tasks besides CPR compressions, and being usable in smaller spaces than would be required by a person performing CPR compressions.

Embodiments of the disclosed technology address shortcomings in existing devices and methods.

DETAILED DESCRIPTION

As described herein, embodiments are directed to a cardiopulmonary resuscitation ("CPR") device where the support leg may be always lockable to the base member. The support leg may be configured to support the chest compression mechanism away from the base member, which may be configured to be placed underneath a patient during operation of the CPR device. The support leg may also be configured to position the chest compression mechanism over the patient's chest to deliver CPR chest compressions to a patient. Prior devices may have required that a latch between the support leg and the base member, or back plate, be unlatched or reset, such as by activating a release handle, before the support leg could be locked to the base member. Since embodiments of the disclosed technology may not require that the lock or latch be reset or unlatched, such embodiments are said to be "always lockable." This feature may make the CPR device easier to use, especially in emergency situations where there may be a therapeutic benefit to the patient if the CPR device can be quickly and properly assembled and positioned for use.

In addition, embodiments of the disclosed technology provide a mechanism for releasing the support leg from the base member by pulling the release mechanism away from the base member. Prior devices may have required that a release mechanism attached to the support leg be activated toward the patient to release the support leg from the base member. But such prior mechanisms may not be operable when, for example, the patient's body prevents or limits movement of the release mechanism, potentially preventing the support leg from being released from the base member. Embodiments of the disclosed technology, by contrast, may not require additional clearance between the patient and the support leg to operate the release mechanism.

Furthermore, in embodiments of the disclosed technology, the clamp mechanism may be configured to deflect in a direction toward a middle portion of the base member to transition the clamp mechanism from the latch-closed configuration to the latch-open configuration. Prior devices may have required that a clamp mechanism or latch be deflected in an outward direction, away from the middle portion of the base member. But such prior mechanisms may not be operable when, for example, objects that are very close to the CPR device prevent or limit movement of the clamp mechanism or latch, potentially preventing the support leg from being released from the base member. Such close objects might include a gurney, medical equipment such as an x-ray machine, or medical supplies such as first-responder gear placed next to the CPR device. Embodiments of the disclosed technology, by contrast, may not require additional clearance around the CPR device to operate the clamp mechanism.

Figure 1:
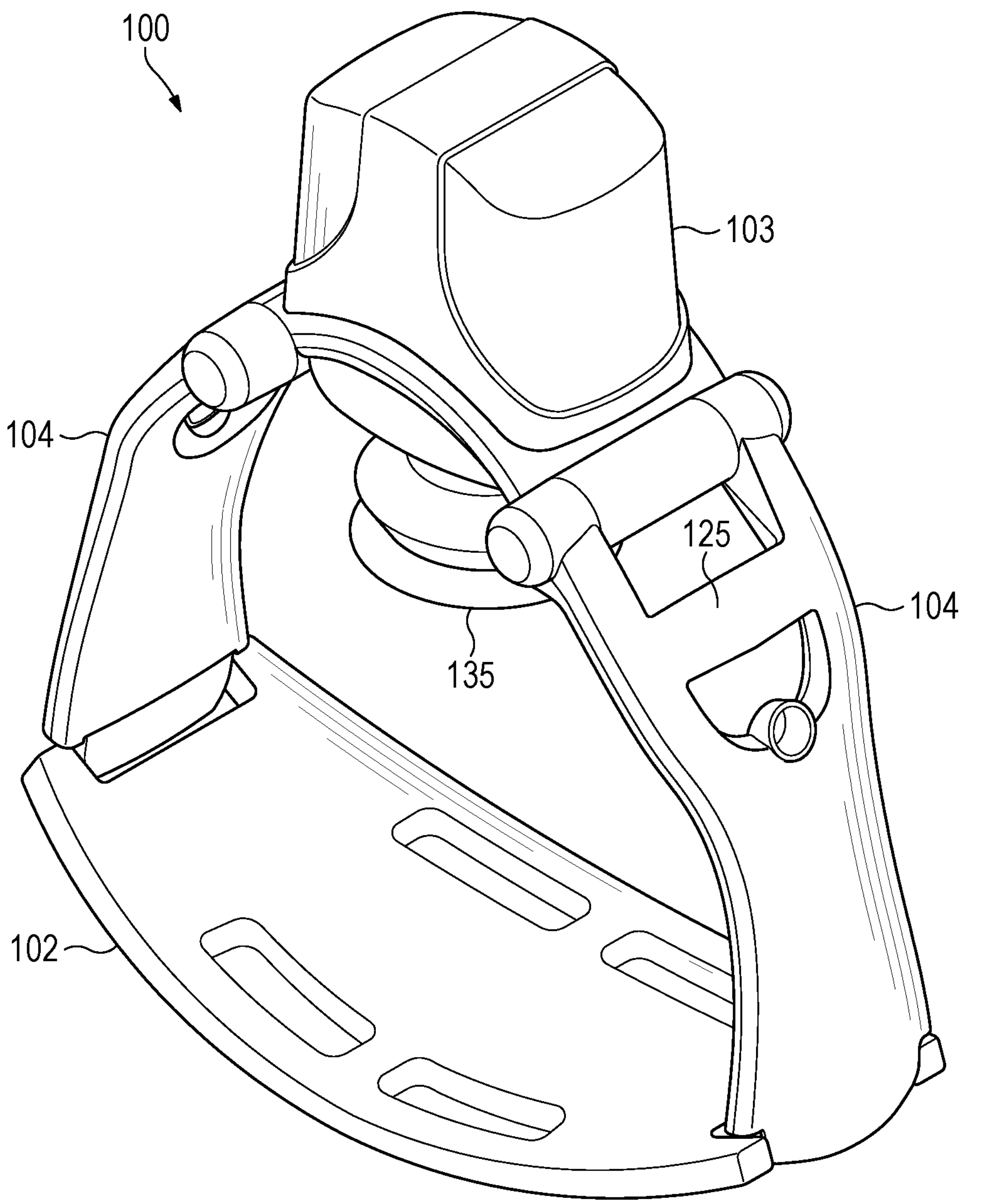
FIG. 1 is a perspective view of a CPR device, according to embodiments.
Figure 2:
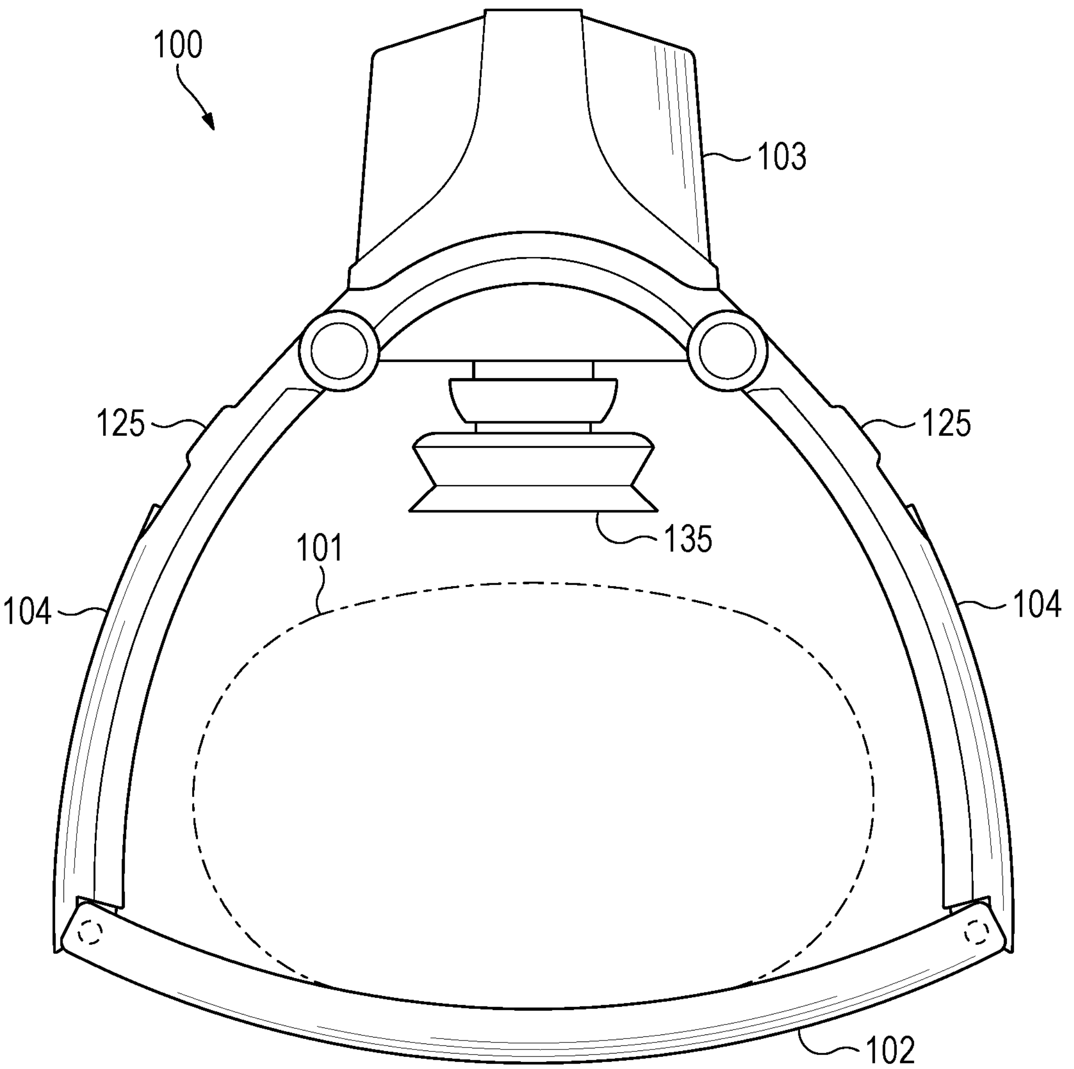
FIG. 2 is a front view of the CPR device of FIG. 1, also showing a representation of a patient within the CPR device.

FIG. 1 is a perspective view showing portions of a CPR device 100, according to embodiments. FIG. 2 is a front view of the CPR device 100 of FIG. 1, also showing a representation of a patient 101 within the CPR device 100. As illustrated in FIGS. 1 and 2, a CPR device 100 may include a base member 102, a chest compression mechanism 103, and a support leg 104.

The chest compression mechanism 103 may be configured to deliver CPR chest compressions to the patient 101. The chest compression mechanism 103 may include, for example, a motor-driven piston 135 configured to contact the patient's chest to provide the CPR chest compressions.

The support leg 104 may be configured to support the chest compression mechanism 103 at a distance from the base member 102. For example, if the base member 102 is underneath the patient 101, who is lying on the patient's back, then the support leg 104 may support the chest compression mechanism 103 at a sufficient distance over the base member 102 to allow the patient 101 to lay within a space between the base member 102 and the chest compression mechanism 103, while positioning the chest compression mechanism 103 over the patient's chest.

In embodiments, there may be two support legs 104. In embodiments, the two support legs 104 may together form an arch to support the chest compression mechanism 103. An example of such a configuration is illustrated in FIGS. 1-2.

Figure 3:
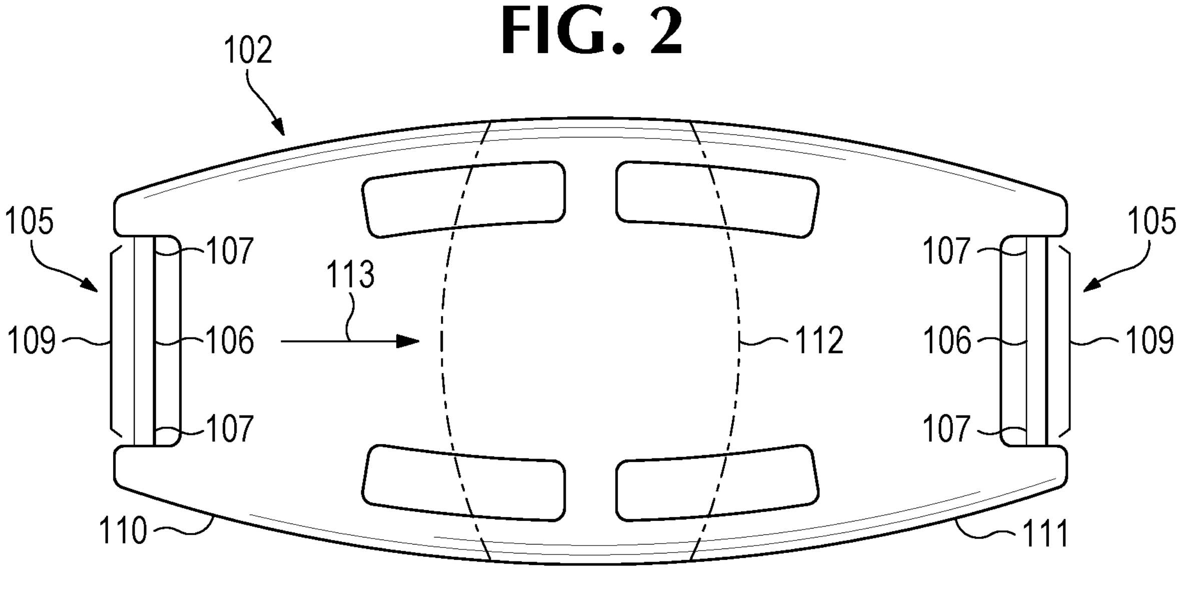
FIG. 3 is a top view of the base plate of FIG. 1 in isolation.

FIG. 3 is a top view of the base member 102 of FIG. 1 in isolation. The base member 102 may be configured to be placed underneath the patient 101, for example when the patient 101 is lying on the patient's back. As illustrated in FIG. 3, the base member 102 may include a lock component 105. The lock component 105 may include, for example, a rod 106 that is attached to the base member 102 at two ends 107 of the rod 106. A clamp mechanism 108 (described below) may attach to a middle portion 109 of the rod 106 that is between the two ends 107 of the rod 106. As illustrated in FIG. 3, the lock component 105 may be at a first end 110 of the base member 102, which is opposite a second end 111 of the base member 102. Thus, a direction from the first end 110 of the base member 102 toward a middle portion 112 of the base member 102 (used below to describe the function of the clamp mechanism 108), may be as indicated by the arrow 113 in FIG. 3. The middle portion 112 of the base member 102 is between the first end 110 of the base member 102 and the second end 111 of the base member 102.

Figure 4:
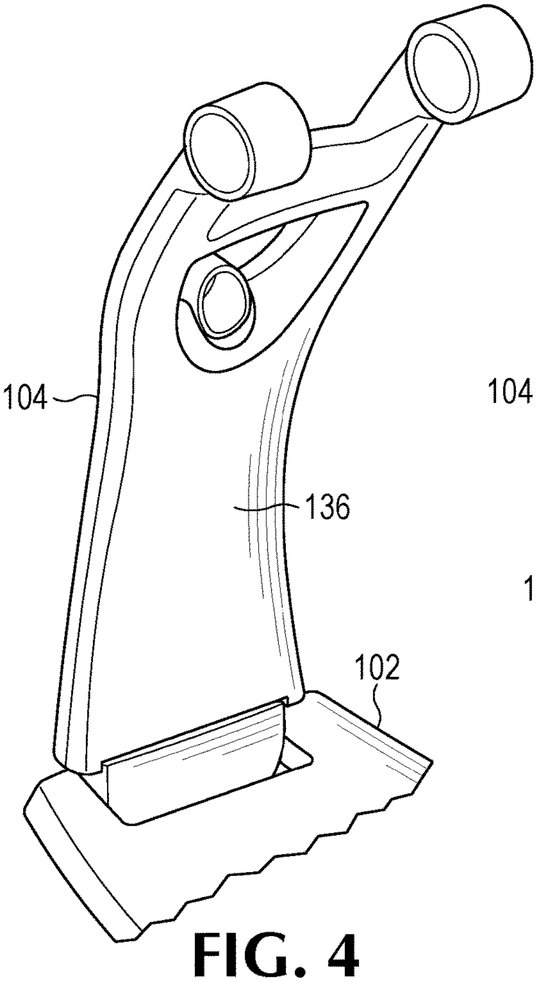
FIG. 4 is a perspective view of the support leg and the base member of FIG. 1 in isolation.
Figure 5:
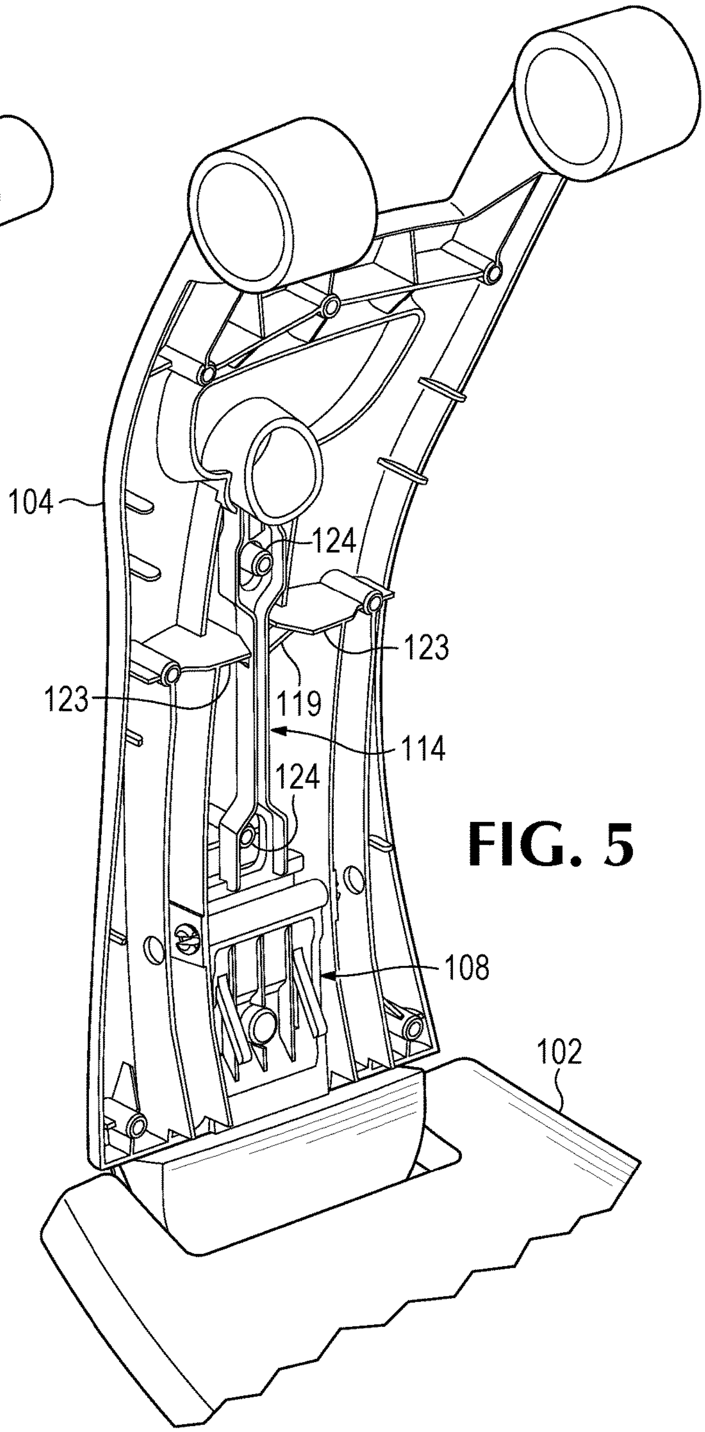
FIG. 5 is a perspective view of the support leg and the base member of FIG. 4 with the near-side covering removed from the support leg in the drawing to show certain interior details.

FIG. 4 is a perspective view of the support leg 104 and the base member 102 of FIG. 1 in isolation. FIG. 5 is a perspective view of the support leg 104 and the base member 102 of FIG. 4 with the near-side covering 136 (see FIG. 4) of the support leg 104 removed from the drawing to show certain interior details. As illustrated in FIGS. 4 and 5, the clamp mechanism 108 may be coupled to the support leg 104, and a release mechanism 114 may be coupled to the support leg 104 and the clamp mechanism 108.

Figure 12:
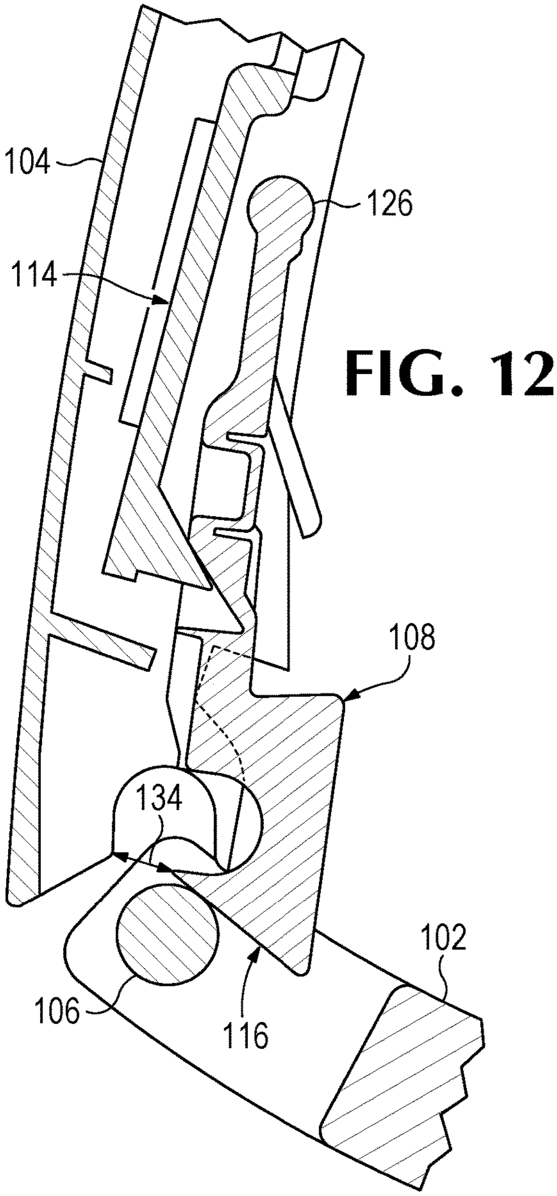
FIG. 12 is a sectional view showing certain details of the junction between the support leg and the base member of FIG. 5 in a first intermediate position between the latch-closed configuration of FIG. 10 and the latch-open configuration of FIG. 13.
Figure 13:
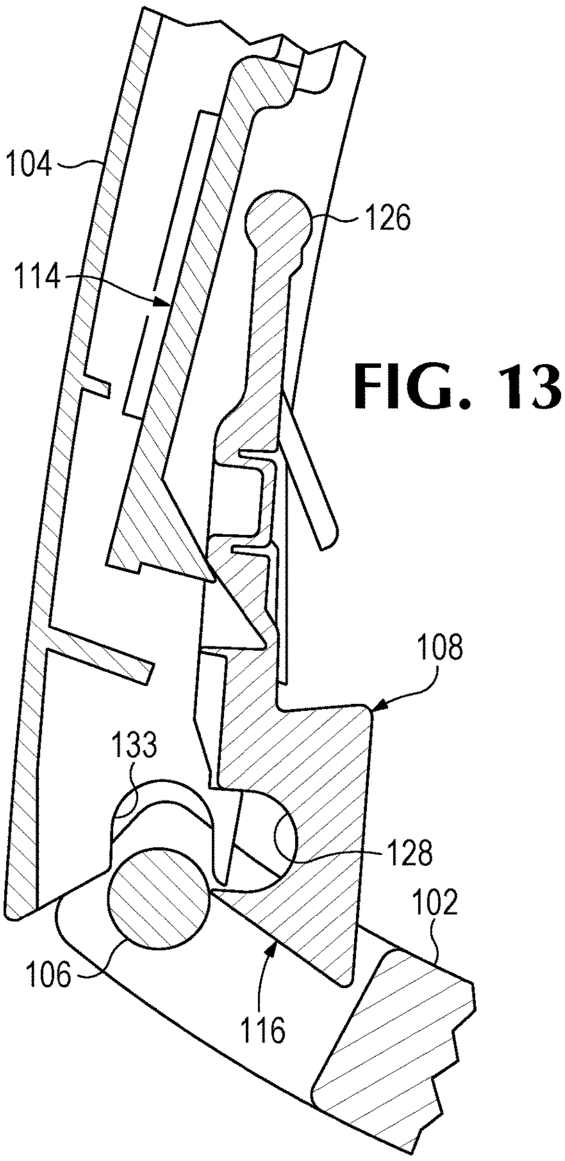
FIG. 13 is a sectional view showing certain details of the junction between the support leg and the base member of FIG. 5 in a latch-open configuration.
Figure 14:
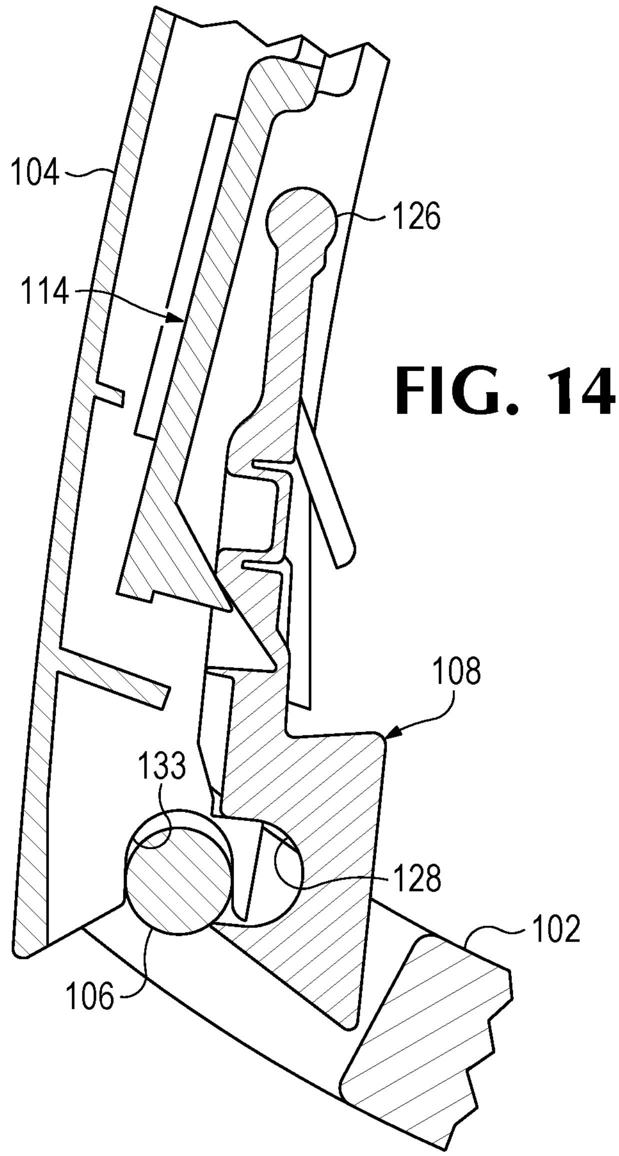
FIG. 14 is a sectional view showing certain details of the junction between the support leg and the base member of FIG. 5 in a second intermediate position between the latch-closed configuration of FIG. 10 and the latch-open configuration of FIG. 13.

The clamp mechanism 108 may be configured to attach the support leg 104 to the lock component 105 of the base member 102 in a latch-closed configuration of the clamp mechanism 108 and to release the support leg 104 from the lock component 105 in a latch-open configuration of the clamp mechanism 108. To transition the clamp mechanism 108 from the latch-closed configuration to the latch-open configuration, the clamp mechanism 108 may be configured, for example, to deflect in the direction 113 toward the middle portion 112 of the base member 102. An example of this deflection is shown in FIGS. 12-14.

The clamp mechanism 108 may further be configured to transition from the latch-closed configuration to the latch-open configuration when the lock component 105 of the base member 102 impinges upon an external portion 116 (see FIGS. 8 and 9) of the clamp mechanism 108. For example, the external portion 116 of the clamp mechanism 108 may be shaped and dimensioned to be displaced when the external portion 116 of the clamp mechanism 108 impacts the lock component 105 of the base member 102. This feature, which is discussed in more detail below, may provide an "always lockable" capability. In other words, the clamping mechanism need not be reset or unclamped by activating the release mechanism 114 before the clamping mechanism attaches the support leg 104 to the base member 102.

The release mechanism 114 may be configured to be pulled away from the base member 102 to transition the clamp mechanism 108 from the latch-closed configuration to the latch-open configuration. In this context, "pulled away" means pulled in a direction away from the base member 102. For example, if the base member 102 is resting on the ground or another flat surface, then the release mechanism 114 may be pulled up, away from the ground. Here, "up" is used for convenience and in reference to the views provided in the figures. The CPR device 100, however, may have a number of orientations in actual use. Thus, a feature that is "up" in the figures may not have that same orientation or direction in actual use.

Figure 6:
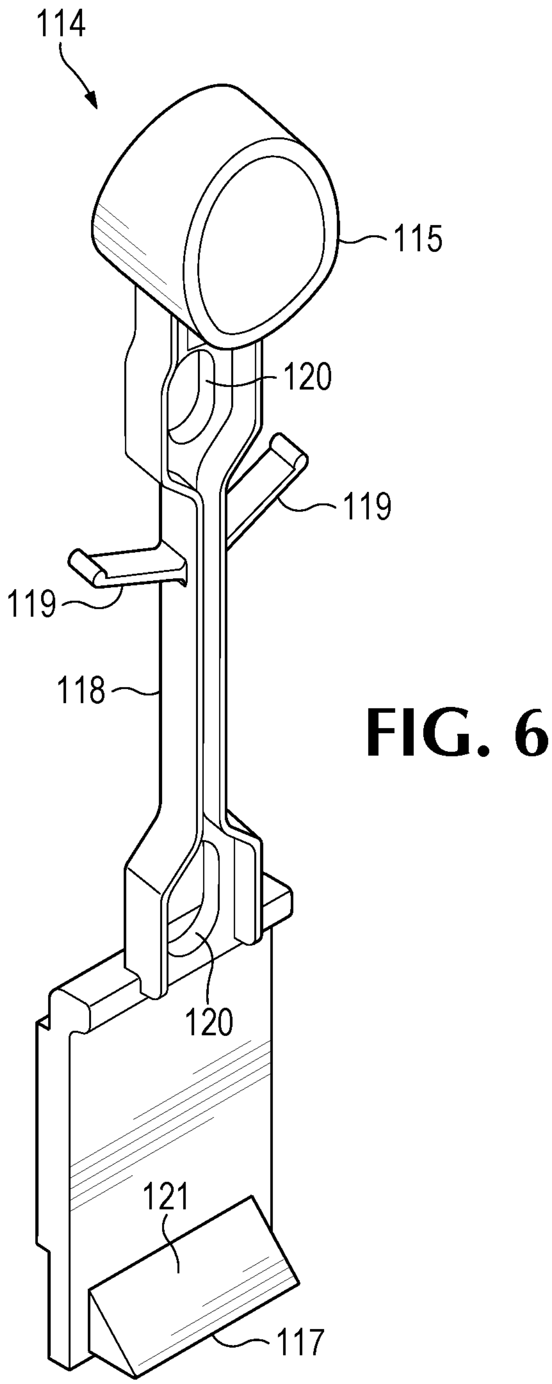
FIG. 6 is a front-side perspective view of the release mechanism of FIG. 5 in isolation.
Figure 7:
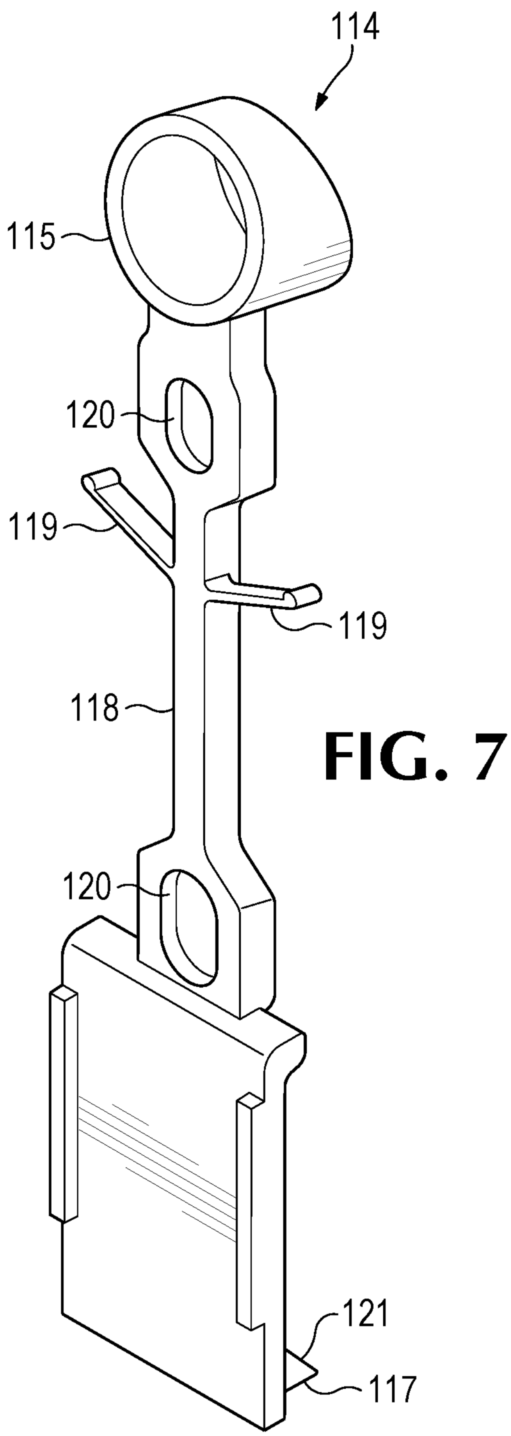
FIG. 7 is a rear-side perspective view of the release mechanism of FIG. 6.

FIG. 6 is a front-side perspective view of the release mechanism 114 of FIG. 5 in isolation. FIG. 7 is a rear-side perspective view of the release mechanism 114 of FIG. 6. As illustrated in FIGS. 6 and 7, the release mechanism 114 may include a pull ring 115 and a wedge portion 117 connected by a link portion 118. The link portion 118 may include a spring tab 119 and a limiting slot 120.

The wedge portion 117 of the release mechanism 114 includes an inclined surface 121 that is configured to interact with a wedge portion 122 of the clamp mechanism 108. For example, when the release mechanism 114 is moving away from the base member 102, the wedge portion 117 of the release mechanism 114 may push the wedge portion 122 of the clamp mechanism 108 in the direction 113 toward the middle portion 112 of the base member 102.

The spring tab 119 may extend from the link portion 118 of the release mechanism 114. The spring tab 119 may be configured to bias the release mechanism 114 toward the base member 102. For example the spring tab 119 may be configured to contact a projection 123 (see FIG. 5) of the support leg 104 and, when the release mechanism 114 is pulled away from the base member 102, impart a counterforce to the release mechanism 114. Thus, when the release mechanism 114 is not pulled away from the base member 102, the release mechanism 114 is biased toward the base member 102. In embodiments, there may be a pair of spring tabs 119, such as illustrated in FIGS. 6 and 7. In such embodiments, the pair of spring tabs 119 may be symmetrical about the link portion 118 of the release mechanism 114.

The limiting slot 120 may be configured to interact with a protrusion 124 (see FIG. 5) extending from the support leg 104 to limit motion of the release mechanism 114 toward and away from the base member 102. In embodiments, there may be a two or more limiting slots 120, such as illustrated in FIGS. 6 and 7.

The pull ring 115 of the release mechanism 114 may be configured to be pulled away from the base member 102. In some embodiments, the pull ring 115 may be pulled in a direction substantially parallel to the support leg 104. As used in this disclosure, "substantially parallel" means largely or essentially following the profile of the support leg 104, without requiring perfect parallelism. For embodiments having arched support legs 104, "substantially parallel" also includes largely or essentially tangential to the profile of the support leg 104. The pull ring 115 may be disposed, for example, near a handle 125 (see FIGS. 1 and 2) of the support leg 104, allowing a user to activate the pull ring 115 while grasping the handle 125.

Figure 8:
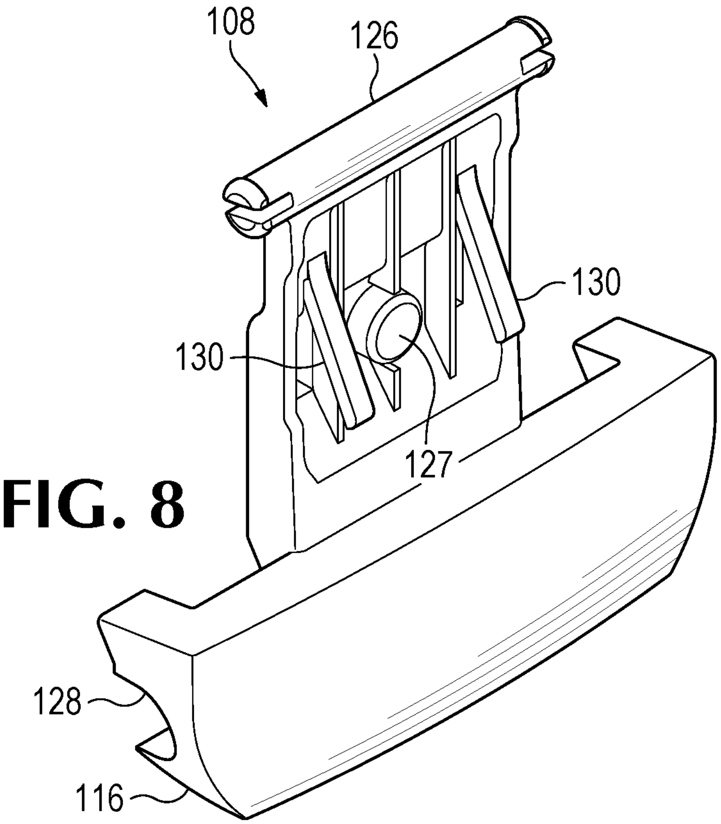
FIG. 8 is a front-side perspective view of the clamp mechanism of FIG. 5 in isolation.
Figure 9:
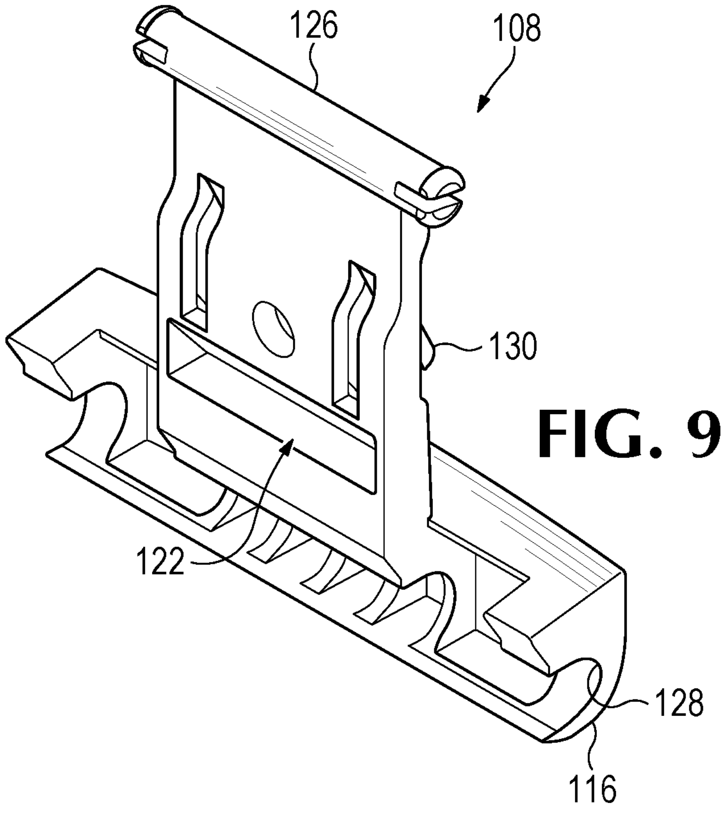
FIG. 9 is a rear-side perspective view of the clamp mechanism of FIG. 8.

FIG. 8 is a front-side perspective view of the clamp mechanism 108 of FIG. 5 in isolation. FIG. 9 is a rear-side perspective view of the clamp mechanism 108 of FIG. 8. As illustrated in FIGS. 8 and 9, the clamp mechanism 108 may include a pivot 126, a spring seat 127, the external portion 116 of the clamp mechanism 108, and a securing channel 128.

The clamp mechanism 108 may be pivotally connected to the support leg 104 by, for example, the pivot 126. The release mechanism 114 may be coupled to the clamp mechanism 108 by a sliding engagement between the wedge portion 117 of the release mechanism 114 and the wedge portion 122 of the clamp mechanism 108. The wedge portion 122 of the clamp mechanism 108 may include an inclined surface 129 that is configured to interact with the inclined surface 121 of the wedge portion 117 of the release mechanism 114. (See also FIG. 10.)

Figure 10:
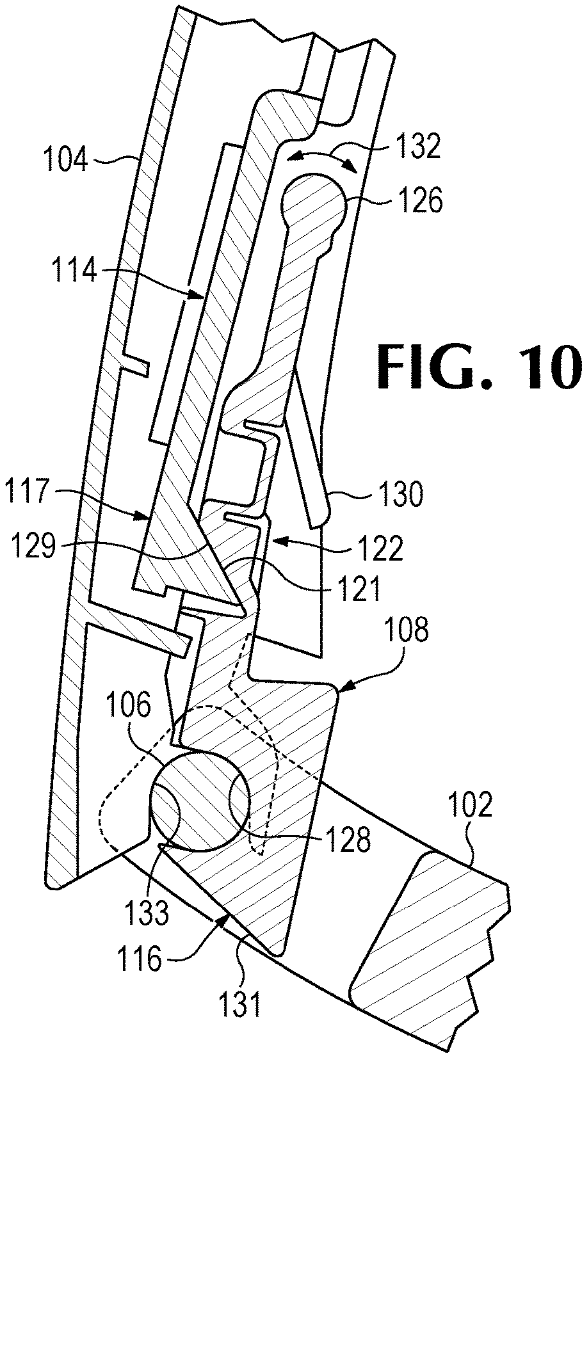
FIG. 10 is a sectional view showing certain details of the junction between the support leg and the base member of FIG. 5 in a latch-closed configuration, with the support leg attached to the lock component of the base member.

A bias element 130 may be configured to apply a force to the clamp mechanism 108 to bias the clamp mechanism 108 in the latch-closed configuration. The bias element 130 may be, for example, a spring tab extending from the clamp mechanism 108, such as shown in FIGS. 8 and 10. For example, the spring tab 130 may be configured to contact the support leg (such as an inside surface of the near-side covering 136 that is removed from FIGS. 5 and 10-14). And, when the clamp mechanism 108 is rotated counterclockwise about the pivot 126 (see FIG. 12), the spring tab 130 may be configured to impart a counterforce to the clamp mechanism 108. Thus, when the clamp mechanism 108 is biased toward the latch-closed configuration.

Alternatively, the bias element 130 may be, for example, a spring, such as a helical compression spring. The bias element 130 may be coupled to the clamp mechanism 108, and the coupling may be, for example, through the spring seat 127. Thus, for example, a helical compression spring may be disposed over the spring seat 127 such that the spring and the spring seat 127 are coaxial. The bias element 130 may also be coupled to the support leg 104. The bias element 130 may be, as another example, a torsion spring at the pivot 126, the torsion spring applying a force between the clamp mechanism 108 and the support leg 104.

As noted above, the external portion 116 of the clamp mechanism 108 may be shaped and dimensioned to be displaced when the external portion 116 of the clamp mechanism 108 impacts the lock component 105 of the base member 102. The external portion 116 of the clamp mechanism 108 may include, for example, an inclined surface 131 (such as illustrated in FIG. 10), configured to contact the lock component 105 during assembly of the CPR device 100.

The securing channel 128 of the clamp mechanism 108 may be configured to accept the lock component 105, such as, for example, the middle portion 109 of the rod 106. In embodiments, the securing channel 128 may be configured to at least partially surround the lock component 105.

In embodiments, the support leg 104, the base member 102, the clamp mechanism 108, and the release mechanism 114 may be made substantially of a radio-translucent material. Radio-translucent materials are translucent in x-rays and other radiographic images, allowing other features to be viewed through the radio-translucent material. As used in this disclosure, "made substantially of a radio-translucent material" means largely or essentially made of a radio-translucent material, without requiring every feature to be so made. For example, fasteners and springs may be metallic and, therefore, not radio-translucent. Radio-translucent materials may be beneficial, for example, when the CPR device 100 is used in a catheterization laboratory or other clinical situation where proper treatment requires that CPR be continued while the patient 101 is subjected to radiographic imaging.

FIG. 10 is a sectional view showing certain details of the junction between the support leg 104 and the base member 102 of FIG. 5 in a latch-closed configuration, with the support leg 104 attached to the lock component 105 of the base member 102. As noted above, the clamp mechanism 108 may be pivotally connected to the support leg 104. For the view shown in FIG. 10, this means that the clamp mechanism 108 may be pivoting clockwise and counterclockwise about the pivot 126, such as indicated by the arrow 132 in FIG. 10. Accordingly, for the embodiment illustrated in FIG. 10, in the latch-closed configuration the clamp mechanism 108 is pivoted as far clockwise as it will travel, being prevented from further clockwise travel by the clamp mechanism 108 contacting the release mechanism 114 or the support leg 104, or both.

Here, "clockwise" and "counterclockwise" are used for convenience and in reference to the views provided in the figures. The CPR device 100, however, may have a number of orientations in actual use. Thus, a feature that is clockwise or counterclockwise in the figures may not have that same direction in actual use.

As illustrated in FIG. 10, the rod 106 is within the securing channel 128 of the clamp mechanism 108 and within a receiving channel 133 of the support leg 104. Thus, the support leg 104 may be attached to the lock component 105 of the base member 102. The receiving channel 133 of the support leg 104 may be configured to accept the lock component 105, such as, for example, the middle portion

109 of the rod 106. In embodiments, the receiving channel 133 may be configured to at least partially surround the lock component 105.

Figure 11:
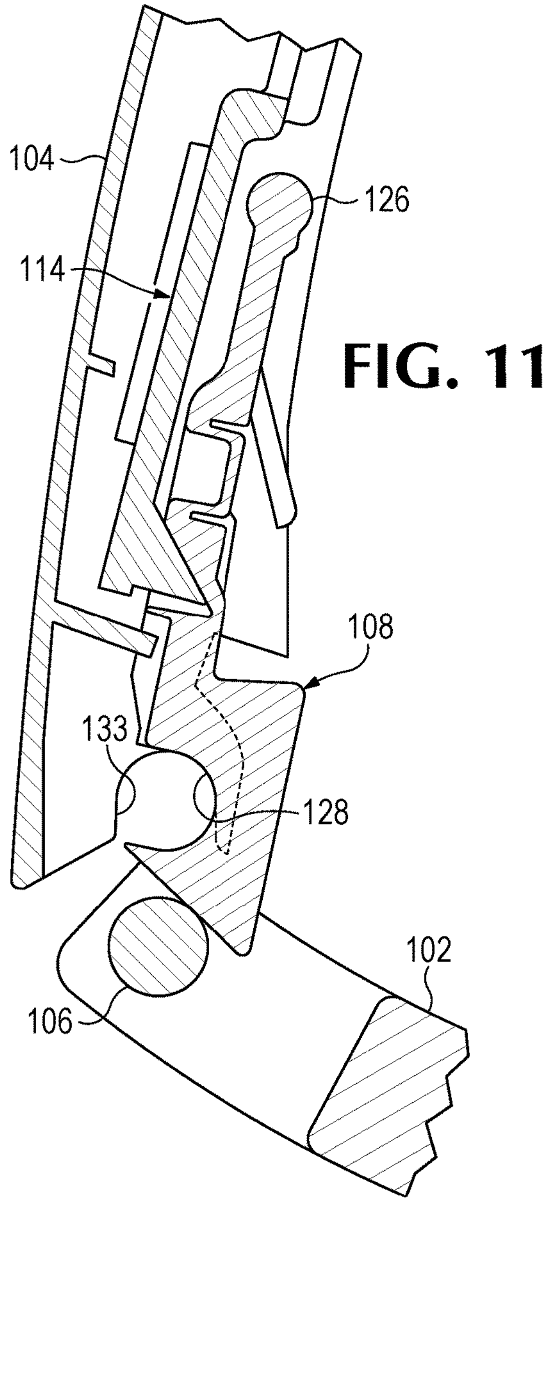
FIG. 11 is a sectional view showing certain details of the junction between the support leg and the base member of FIG. 5 in the latch-closed configuration, with the support leg not attached to the lock component of the base member.

Additionally, the latch-closed configuration does not require that the lock component 105 be in the securing channel 128 of the clamp mechanism 108. In other words, the lock component 105 of the base member 102 need not be attached to the support leg 104 in the latch-closed configuration. Accordingly, FIG. 11 is a sectional view showing certain details of the junction between the support leg 104 and the base member 102 of FIG. 5 also in the latch-closed configuration, with the support leg not attached to the lock component of the base member. As illustrated in FIG. 11, the lock component 105 of the base member 102 is not within the securing channel 128 of the clamp mechanism 108 or the receiving channel 133 of the support leg 104. Hence, FIG. 11 is an example of the "always lockable" position.

FIG. 12 is a sectional view showing certain details of the junction between the support leg 104 and the base member 102 of FIG. 5 in a first intermediate position between the latch-closed configuration of FIG. 10 and the latch-open configuration of FIG. 13. As illustrated in FIG. 12, the rod 106 of the lock component 105 may be in contact with the external portion 116 of the clamp mechanism 108. The contact may cause the rod 106 to apply a force to the clamp mechanism 108, causing the clamp mechanism 108 to rotate counterclockwise about the pivot 126 from the perspective shown in FIG. 12. The pivoting causes a gap 134 to widen between the clamp mechanism 108 and the support leg 104.

FIG. 13 is a sectional view showing certain details of the junction between the support leg 104 and the base member 102 of FIG. 5 in a latch-open configuration. As illustrated in FIG. 13 the force applied to the clamp mechanism 108 by the rod 106 has caused the clamp mechanism 108 to rotate counterclockwise further than what is shown in FIG. 12. The counterclockwise rotation about the pivot 126 is sufficient to allow the gap 134 to widen enough for the rod 106 to enter the receiving channel 133 of the support leg 104. Thus, FIG. 13 is an example of the latch-open configuration: the receiving channel 133 is open to receive the rod 106.

FIG. 14 is a sectional view showing certain details of the junction between the support leg 104 and the base member 102 of FIG. 5 in a second intermediate position between the latch-closed configuration of FIG. 10 and the latch-open configuration of FIG. 13. As illustrated in FIG. 14, the rod 106 has begun to enter the receiving channel 133 of the support leg 104. As a result, the clamp mechanism 108 begins to rotate clockwise about the pivot 126 toward the latch-closed configuration of FIG. 10.

Examples

Illustrative examples of the disclosed technologies are provided below. An embodiment of the technologies may include one or more, and any combination of, the examples described below.

Example 1 includes a cardiopulmonary resuscitation ("CPR") device, comprising: a base member configured to be placed underneath a patient; a chest compression mechanism configured to deliver CPR chest compressions to a patient; a support leg configured to support the chest compression mechanism at a distance from the base member; a clamp mechanism coupled to the support leg and configured to attach the support leg to a lock component of the base member in a latch-closed configuration of the clamp mechanism and to release the support leg from the lock component in a latch-open configuration of the clamp mechanism, the clamp mechanism further configured to transition from the latch-closed configuration to the latch-open configuration when the lock component of the base member impinges upon an external portion of the clamp mechanism; and a release mechanism coupled to the support leg and the clamp mechanism and configured to be pulled away from the base member to transition the clamp mechanism from the latch-closed configuration to the latch-open configuration.

Example 2 includes the CPR device of Example 1, in which the lock component comprises a rod attached to the base member at two ends of the rod, the clamp mechanism attaching to a middle portion of the rod between the two ends of the rod.

Example 3 includes the CPR device of any of Examples 1-2, in which the lock component is at a first end of the base member, the first end of the base member being opposite a second end of the base member, and in which, to transition the clamp mechanism from the latch-closed configuration to the latch-open configuration, the clamp mechanism is configured to deflect in a direction toward a middle portion of the base member, the middle portion of the base member being between the first end of the base member and the second end of the base member.

Example 4 includes the CPR device of any of Examples 1-3, in which the release mechanism comprises a pull ring configured to be pulled away from the base member.

Example 5 includes the CPR device of any of Examples 1-4, in which the base member, the support leg, the clamp mechanism, and the release mechanism are made substantially of a radio-translucent material.

Example 6 includes the CPR device of any of Examples 1-5, in which the clamp mechanism is pivotally connected to the support leg, and in which the release mechanism is coupled to the clamp mechanism by a wedge portion of the release mechanism in sliding engagement with a wedge portion of the clamp mechanism.

Example 7 includes the CPR device of Example 6, in which the release mechanism comprises: a pull ring configured to be pulled away from the base member; and a link portion connecting the pull ring to the wedge portion of the release mechanism, the link portion further comprising a spring tab extending from the link portion, the spring tab configured to contact the support leg and bias the release mechanism toward the base member.

Example 8 includes the CPR device of Example 7, in which the link portion further comprises a limiting slot, the limiting slot configured to interact with a protrusion extending from the support leg to limit motion of the release mechanism toward and away from the base member.

Example 9 includes the CPR device of any of Examples 1-8, further comprising a bias element configured to apply a force to the clamp mechanism to bias the clamp mechanism in the latch-closed configuration.

Example 10 includes a cardiopulmonary resuscitation ("CPR") device, comprising: a base member configured to be placed underneath a patient; a chest compression mechanism configured to deliver CPR chest compressions to a patient; a support leg configured to support the chest compression mechanism at a distance from the base member; and a clamp mechanism coupled to the support leg and configured to attach the support leg to a lock component of the base member in a latch-closed configuration of the clamp mechanism and to release the support leg from the lock component in a latch-open configuration of the clamp mechanism, the clamp mechanism further configured to transition from the latch-closed configuration to the latch-open configuration when the lock component of the base member impinges upon an external portion of the clamp mechanism, the lock component comprising a rod attached to the base member at two ends of the rod, the clamp mechanism attaching to a middle portion of the rod between the two ends of the rod.

Example 11 includes the CPR device of Example 10, in which the lock component is at a first end of the base member, the first end of the base member being opposite a second end of the base member, and in which, to transition the clamp mechanism from the latch-closed configuration to the latch-open configuration, the clamp mechanism is configured to deflect in a direction toward a middle portion of the base member, the middle portion of the base member being between the first end of the base member and the second end of the base member.

Example 12 includes the CPR device of any of Examples 10-11, further comprising a release mechanism coupled to the support leg and the clamp mechanism and configured to be pulled away from the base member to transition the clamp mechanism from the latch-closed configuration to the latch-open configuration.

Example 13 includes the CPR device of Example 12, in which the release mechanism comprises a pull ring configured to be pulled away from the base member.

Example 14 includes the CPR device of any of Examples 2 and 10-13, in which the clamp mechanism comprises a securing channel configured to accept the middle portion of the rod, and the support leg comprises a receiving channel configured to accept the middle portion of the rod, in which the middle portion of the rod is within the securing channel and within the receiving channel when the support leg is attached to the lock component of the base member.

Example 15 includes a cardiopulmonary resuscitation ("CPR") device, comprising: a base member configured to be placed underneath a patient; a chest compression mechanism configured to deliver CPR chest compressions to a patient; a support leg configured to support the chest compression mechanism at a distance from the base member; and a clamp mechanism coupled to the support leg and configured to attach the support leg to a lock component at a first end of the base member in a latch-closed configuration of the clamp mechanism and to release the support leg from the lock component in a latch-open configuration of the clamp mechanism, the clamp mechanism further configured to transition from the latch-closed configuration to the latch-open configuration when the lock component of the base member impinges upon an external portion of the clamp mechanism, in which, to transition the clamp mechanism from the latch-closed configuration to the latch-open configuration, the clamp mechanism is configured to deflect in a direction toward a middle portion of the base member, the middle portion of the base member being between the first end of the base member and the second end of the base member.

Example 16 includes the CPR device of Example 15, in which the lock component comprises a rod attached to the base member at two ends of the rod, the clamp mechanism attaching to a middle portion of the rod between the two ends of the rod.

Example 17 includes the CPR device of Example 16, in which the clamp mechanism comprises a securing channel configured to accept the middle portion of the rod, and the support leg comprises a receiving channel configured to accept the middle portion of the rod, in which the middle portion of the rod is within the securing channel and within the receiving channel when the support leg is attached to the lock component of the base member.

Example 18 includes the CPR device of any of Examples 15-17, further comprising a release mechanism coupled to the support leg and the clamp mechanism and configured to be pulled away from the base member to transition the clamp mechanism from the latch-closed configuration to the latch-open configuration.

Example 19 includes the CPR device of any of Examples 15-18, in which the release mechanism comprises a pull ring configured to be pulled away from the base member.

Example 20 includes the CPR device of any of Examples 10-19, further comprising a bias element configured to apply a force to the clamp mechanism to bias the clamp mechanism in the latch-closed configuration.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A cardiopulmonary resuscitation (CPR) device, comprising:

a base member configured to be placed underneath a patient;

a chest compression mechanism configured to deliver CPR chest compressions to the patient;

a support leg configured to support the chest compression mechanism at a distance from the base member;

a clamp mechanism coupled to the support leg and configured to attach the support leg to a lock component of the base member in a latch-closed configuration of the clamp mechanism and to release the support leg from the lock component in a latch-open configuration of the clamp mechanism; and a release mechanism coupled to the support leg and the clamp mechanism and configured to be pulled away from the base member and along the support leg in a direction substantially parallel to the support leg to disengage a wedge portion of the release mechanism from a wedge portion of the clamp mechanism by causing the wedge portion of the release mechanism to slidably engage the wedge portion of the clamp mechanism and to transition the clamp mechanism from the latch-closed configuration to the latch-open configuration.

2. The CPR device of claim 1, in which the lock component comprises a rod attached to the base member at two ends of the rod, the clamp mechanism attaching to a middle portion of the rod between the two ends of the rod.

3. The CPR device of claim 1, in which the lock component is at a first end of the base member, the first end of the base member being opposite a second end of the base member, and in which, to transition the clamp mechanism from a latch-closed configuration to a latch-open configuration, the clamp mechanism is configured to deflect in a direction toward a middle portion of the base member, the middle portion of the base member being between the first end of the base member and the second end of the base member.

4. The CPR device of claim 1, in which the release mechanism comprises a pull ring configured to be pulled away from the base member.

5. The CPR device of claim 1, in which the base member, the support leg, the clamp mechanism, and the release mechanism are made substantially of a radio-translucent material.

6. The CPR device of claim 1, in which the clamp mechanism is pivotally connected to the support leg, and in which the release mechanism is coupled to the clamp mechanism by the wedge portion of the release mechanism in sliding engagement with the wedge portion of the clamp mechanism.

7. The CPR device of claim 1, further comprising a bias element configured to apply a force to the clamp mechanism to bias the clamp mechanism in the latch-closed configuration.

8. A cardiopulmonary resuscitation (CPR) device, comprising:

a base member configured to be placed underneath a patient;

a chest compression mechanism configured to deliver CPR chest compressions to the patient;

a support leg configured to support the chest compression mechanism at a distance from the base member;

a clamp mechanism coupled to the support leg and configured to attach the support leg to a lock component of the base member in a latch-closed configuration of the clamp mechanism and to release the support leg from the lock component in a latch-open configuration of the clamp mechanism; and a release mechanism coupled to the support leg and the clamp mechanism and configured to be pulled away from the base member and along the support leg in a direction substantially parallel to the support leg to disengage a wedge portion of the release mechanism from a wedge portion of the clamp mechanism by causing the wedge portion of the release mechanism to slidably engage the wedge portion of the clamp mechanism and to transition the clamp mechanism from the latch-closed configuration to the latch-open configuration, the release mechanism comprising a link portion connecting a pull ring to the wedge portion of the release mechanism.

9. The CPR device of claim 8, in which the wedge portion of the release mechanism includes an inclined surface configured to interact with the wedge portion of the clamp mechanism.

10. The CPR device of claim 8, in which the lock component comprises a rod attached to the base member at two ends of the rod, the clamp mechanism attaching to a middle portion of the rod between the two ends of the rod.

* * * * *